June 27, 1939.  R. J. BROWN ET AL  2,164,186
MANUFACTURE OF SUGAR
Filed May 3, 1937
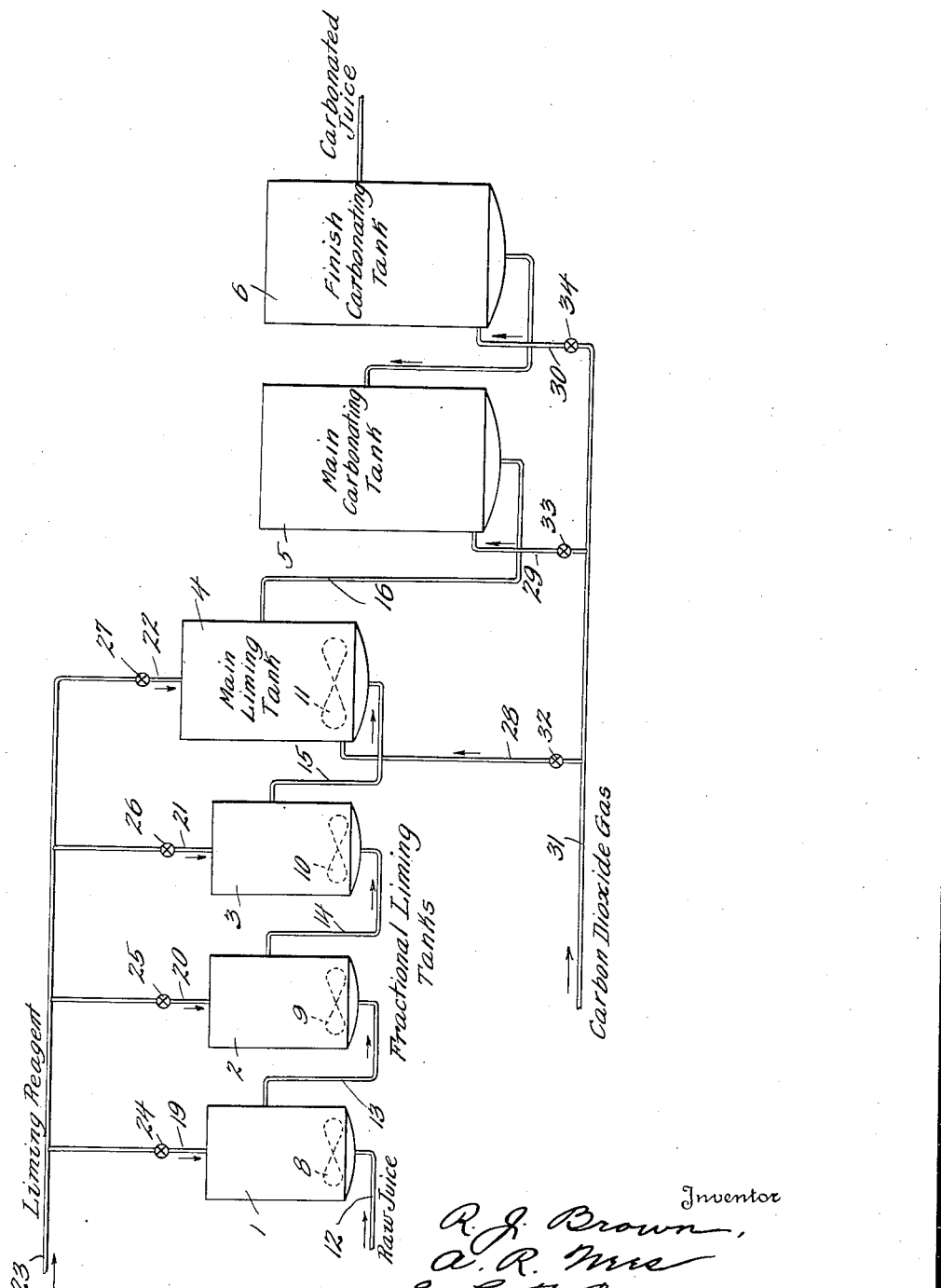

Patented June 27, 1939

2,164,186

UNITED STATES PATENT OFFICE 2,164,186

MANUFACTURE OF SUGAR

Robert J. Brown and Alpheus R. Nees, Denver, and Claude T. Carney, Greeley, Colo., assignors to The Great Western Sugar Company, Denver, Colo., a corporation of New Jersey Application May 3, 1937, Serial No. 140,528

14 Claims. (Cl. 127—50)

This invention relates to the manufacture of sugar, and particularly to the purification or defecation step in which impurities are removed from the sugar juice derived from cane or beets. The process of the present invention will be described in connection with the manufacture of sugar from beets, but it is to be understood that our invention is not limited, in its application, to the manufacture of sugar from beets, but pertains to the purification of sugar juice regardless of its source.

An object of our invention is the provision of a continuous process for the purification of sugar juice, having greater economy than any process employed heretofore. A further object is the provision of such a process which may be conveniently and quickly carried out, which results in an efficient purification of the sugar juice, which produces precipitates of the desired physical characteristics for rapid filtration and efficient washing and which requires the use of smaller quantities of the purifying agents than any process heretofore employed, thus effecting a substantial saving in the cost of the manufacturing process. A further object of the invention is the provision of a continuous process which imparts maximum purification and filterability to sugar juice and requires minimum quantities of purifying agents, while at the same time enabling improved uniformity, control and economy of process operations.

Referring, for purposes of illustration, to the manufacture of beet sugar, the beets are first washed and cut into small pieces, termed "cossettes", after which the sugar content of the beets is extracted in water by a well known process termed "diffusion", the resultant product being known as "diffusion juice". The diffusion juice ordinarily amounts to about one and one-half times the quantity of beets treated, by weight, and contains approximately 10% to 11% sugar in solution. The juice, however, contains a considerable proportion of impurities, that is to say, non-sugars, which proportion must be largely reduced in order that the succeeding steps of the manufacturing process may be efficiently carried out. It is impractical, commercially, to remove all of the impurities present in the juice, but by the process of the present invention it is possible quickly and economically to substantially reduce the proportion of such impurities. For example, the proportion of sugar in the total solids of the diffusion juice is ordinarily about 87%. After treatment in accordance with the present invention the proportion of sugar to total solids in the treated juice is about 92%, or perhaps higher, though in the usual case it is impractical, commercially, to attain higher purities.

The nature of the impurities in the diffusion juice is not entirely known. Certain impurities are present in true solution, and others in colloidal suspension. The usual method of removing them is by treating the juice with lime and carbon dioxide, the lime being added in the form of milk of lime (a water suspension of calcium hydroxide) or as a suspension of calcium saccharate, called "saccharate milk", to precipitate the impurities, after which carbon dioxide gas is introduced into the limed juice to precipitate the excess lime. This type of process, in which lime and carbon dioxide are employed as the purifying agents, is known in the art as a carbonation process and is usually completed in two stages known as "first carbonation" and "second carbonation". The process of the present invention relates particularly to purification treatments extending through the first carbonation, in which the major portion of impurities is removed from the sugar juice. After the first carbonation the juice is filtered to remove the precipitates, and it is then ready for further purification and for succeeding steps in the manufacture of sugar.

Other compounds of alkaline earth metals, for example the hydroxides of barium and strontium, may be used in place of lime, but at the present time are impractical commercially, due to their cost. For convenience, the term "liming reagent" will be employed hereinafter, and will be understood as including all of the suitable materials mentioned. Quantities and degrees of alkalinity will be stated in terms of equivalent quantities of lime, CaO. It is customary to speak of the total amount of liming reagent used for purification in terms of percentage of lime or CaO "on beets", because the amount required for purification is determined by the quantity of impurities introduced from the beets and not by the volume of juice, which may vary in its ratio to beets. The alkalinity of the juices is a chemical control figure and is expressed as grams CaO per 100 ml. of juice.

Some of the impurities found in the juice, such as phosphates, oxalates and sulfates, form definite insoluble compounds with lime. Others form indefinite insoluble compounds, of the nature of addition products. The solubilities of these compounds depends upon the alkalinity of the juice, the maximum precipitation being obtained when the juice is saturated with lime. Other impurities, of a colloidal nature, may be coagulated and precipitated by the action of lime under controlled conditions, the optimum alkalinity of the juice for the precipitation of these impurities being from 0.04 to 0.06, calculated in terms of grams CaO per 100 milliliters of juice, corresponding to a pH of 10.6 to 11.4, which is a definitely lower alkalinity than that of a juice saturated with lime, which has an alkalinity in excess of 0.25 gram CaO per 100 ml. juice, corresponding to a pH in excess of 12.0.

If the defecation is not conducted so that these colloids are completely precipitated before the juice is saturated with lime, they are only incompletely precipitated during the saturation period, and that portion which is not precipitated acts detrimentally on the separation of precipitated matter from the juice in a later step, besides passing into the final juice as an impurity. Finally, still other colloidal impurities, apparently entering into no chemical reaction with lime, are either adsorbed by the precipitate formed during the defecation and carbonation steps or are trapped mechanically during these steps and are thus swept out of the juice and thereby separated therefrom during filtration or its equivalent.

It has long been known that the quantity of lime needed to produce a satisfactory defecation of juice by the usual methods of treatment is far in excess of that required for chemical combination with the non-sugars, and it is thought that the excess lime, during the process of carbonation, acts as an adsorbing agent for certain colloidal non-sugars and also as a "filter-aid" in promoting the filterability of the precipitate. If, therefore, the process be so carried out that the colloids are effectively coagulated and the mixture of precipitated non-sugars and carbonated lime is obtained in such improved physical condition as to be readily removed by the usual means, it would be possible to perform a satisfactory defecation at a considerable saving of lime.

For a number of years attempts have been made to attain this end by various methods of fractional liming. In general, lime in the form of milk of lime or calcium saccharate is added to the raw diffusion juice in just sufficient quantity to bring about the maximum coagulation of the precipitable colloidal substances. This coagulation occurs at pH 10.6 to 11.4 and at an alkalinity of 0.04 to 0.06 gram CaO per 100 ml. juice, and the quantity of lime required amounts to 0.02% to 0.3% of the weight of beets treated. The addition of the lime is carried out slowly to raise the pH and alkalinity of the juice to points in the above ranges which theoretically will result in optimum coagulation of colloidal impurities into large flocs. The pre-limed juice is then heated and afterward subjected to the usual liming and carbonating treatments before filtration. According to the Teatini process, the heating of juice that has been pre-limed to the optimum isoelectric point for coagulation is preceded by a treatment with liquid sulfur dioxide, which is said to stabilize the coagulated colloids against redispersion during the subsequent lime saturation.

It is recognized that known methods of fractional liming brings about a more complete precipitation of the colloidal substances than occurs when the liming takes place in a single step. Furthermore, the precipitate obtained by proper fractional liming is coarser and more dense. This improved quality of the precipitate carries through to the final liming and carbon dioxide treatment, so that less filter-aid in the form of precipitated calcium carbonate is required to obtain efficient filtration. Therefore less total lime is required in the process to attain the desired purification and ease of filtration than in the case of a simple batch carbonation process. The use of these known methods, however, has not been attended by the anticipated reduction in reagent requirements, due to the fact that poor filterability of the carbonated juice results whenever the lime additions are reduced substantially below 2 to 3% CaO on beets.

One of the new features of the process provided by our invention relates particularly to the liming of the sugar juice. We have found that the benefits heretofore obtained from known methods of fractional liming are increased and made more certain of attainment if the process is carried out in successive stages separated by appreciable time intervals, and in a continuous manner, at a temperature of 80° C. to 90° C., preferably about 85° C., and if the lime addition is continued until an excess over the theoretical quantity required for maximum coagulation has been added, for example, to a total of 0.4% to 0.6% CaO on beets, which gives the juice an alkalinity equivalent to about 0.10 to 0.18 gram CaO per 100 ml. of juice. This initial liming may be followed by the addition of the rest of the lime and carbon dioxide treatment in batches in the usual manner. The juice is carbonated until the alkalinity is reduced to 0.07 to 0.10 gram per 100 ml. If the alkalinity is reduced appreciably below this figure, some of the impurities are redissolved; if the alkalinity is too high, filtration is difficult. After filtration the juice is subjected to a second carbonation which removes practically all of the lime. This second step, however, does not concern the present process.

Methods have been sought for carrying out the carbonation process in a continuous manner, with a view to saving labor and other operating costs in carbonation and in the subsequent removal of the precipitated solids. In order that this removal or filtration step may be carried out advantageously from an economic standpoint, it is necessary that the precipitate in the treated juice be of a dense granular character, so as to have a high rate of subsidence and a rapid rate of filtration, and, moreover, this condition must be uniformly maintained at all times. This uniformity is impossible of attainment by the batch system. These results have heretofore been sought in the following manner (U. S. Patent No. 1,755,165): The incoming raw juice is mixed with several times its volume of finished carbonated juice, the required amount of liming reagent, corresponding to the volume of raw juice, is added to the mixture, and the mixture is carbonated to the proper end point. While this method produces a precipitate of satisfactory physical characteristics, no economy in lime results. Moreover, the process has a serious fault, in that it fails to produce maximum purification of the juice since at no time during the process is the total alkalinity of the juice more than very slightly higher than that of finished juice (about 0.10 g. CaO per 100 ml.), whereas we have discovered that at some time during the defecation process it is beneficial to treat the juice with an excess of lime, giving it an alkalinity above 0.25 g. per ml., in order that the maximum purification of the juice be attained. No successful continuous carbonation process has heretofore been devised wherein maximum purification of the juice and the economical formation of easily filterable precipitates are both possible.

Hence another important feature of our invention resides in the provision of a successful continuous carbonation process which imparts maximum purification and filterability to the sugar juice, permits important savings by reducing the amounts of liming reagent, and at the same time gives the uniformity of operations and other advantages and economies which attend a successful continuous process. In contrast with the prior type of process mentioned above, we have discovered that maximum purification and filterability of the juice may be obtained, and with important savings of lime, by a carbonation process of the type herein disclosed in which a continuously flowing stream of juice is pre-limed in a special manner, then treated with lime to impart an alkalinity of at least 0.25 grams CaO per 100 ml. of juice, then treated with carbon dioxide to reduce the alkalinity to a point giving an easily filterable precipitate, and finally passed onward for removal of the precipitates.

The process according to preferred embodiments of the present invention is a continuous carbonation process which provides a means for obtaining a complete saturation of the juice with lime and at the same time obtaining a precipitate, in the final carbonated juice, of such characteristics that it may be readily separated by sedimentation and/or filtration and the whole accomplished with a substantial saving of lime. These desired results are brought about by utilizing a special type of fractional liming together with steps resulting in complete saturation of the juice with the liming reagent before precipitating the lime with carbon dioxide to bring the juice to the proper alkalinity for the removal of precipitates. This is accomplished by providing for a straight line flow of juice through a series of tanks, lime and carbon dioxide being added in appropriate quantities and at appropriate times, so that the juice passes through, first, a fractional liming stage, during which the optimum point of alkalinity or pH for the maximum precipitation of colloids is attained and exceeded; second, the complete saturation of the juice with lime, so as to complete the precipitation of precipitable matter; and third, precipitation of the excess lime as calcium carbonate by passing gas containing carbon dioxide into the continuously flowing stream of limed juice until the concentration of the soluble lime has been reduced to about 0.07 to 0.10 g. per 100 ml. of juice. Having carried out these steps successively and in a continuous manner, it is found that the precipitated solids in the juice after completion of the carbonation have the desired physical characteristics. All of this is accomplished without the return of finished carbonated juice to any point in the system and with a substantial saving of lime. Approximately 1.5% lime on beets is required as compared to the usual 2.0% to 3.0%.

In describing our process, we will have reference to the accompanying drawing, which illustrates diagrammatically a system in which our process may be successfully carried out.

The system comprises generally a series of six tanks numbered consecutively in the order in which the juice progresses through them. Tanks 1, 2 and 3 are provided with suitable mechanical agitators 8, 9, 10, and tank 4 may also be provided with an agitator 11 if desired, although the agitator 11 may be dispensed with, as will be explained. A conduit 12 is provided for supplying raw juice to the first tank 1, and conduits 13 to 17, inclusive, are provided for conducting the juice from one tank to another, successively. A conduit 18 is provided for conducting the carbonated juice from the last tank 6 to the filters.

Tanks 1, 2, 3 and 4 are provided with conduits 19, 20, 21 and 22, respectively, communicating with a liming reagent supply conduit 23, which in turn communicates with a source of liming reagent, not shown. The conduits 19, 20, 21 and 22 are provided with suitable valves 24, 25, 26 and 27, respectively, for controlling the flow of liming reagent therethrough.

Tanks 4, 5 and 6 are provided with conduits 28, 29 and 30, respectively, communicating with a supply conduit 31, which in turn communicates with a source of carbon dioxide, not shown. The conduits 28, 29 and 30 are provided with valves 32, 33 and 34, respectively, for controlling the flow of carbon dioxide to the several tanks.

Tanks 1, 2 and 3 have been designated as fractional liming tanks; tank 4 as the main liming tank; tank 5 as the main carbonating tank; and tank 6 as the finish carbonating tank.

The complete process may be carried out in the following manner: Raw beet juice heated to a temperature of 80° C. to 90° C. is led into the first tank 1 and the process of fractional addition of the liming reagent is begun. Lime in the form of milk of lime or saccharate milk, is added in a regulated amount through the conduit 19, in accordance with the rate of flow of the juice, so that the quantity added to the juice in tank 1 amounts to 0.1% to 0.15% on beets, giving the juice an alkalinity of 0.025 to 0.03 gram CaO per 100 ml. The juice progresses through the other tanks in turn; a similar amount of lime is added to the juice in tank 2 giving the juice an alkalinity of 0.05 to 0.06 gram CaO per 100 ml.; and a still further quantity in tank 3, so that the total amount of lime added to the three fractional liming tanks is equivalent to 0.4% to 0.6% on beets, giving an alkalinity of 0.10 to 0.18, preferably about 0.12. Thorough mixing of the lime and juice is ensured by the mechanical agitators 8, 9 and 10.

It will be noted that lime in excess of the amount required to produce the optimum alkalinity or H ion concentration for the maximum precipitation of colloids is added in the fractional liming tanks. This is in accordance with our discovery that such excess lime is desirable and beneficial. The best results in fractional liming are obtained when the optimum alkalinity or pH is gradually approached, reached and exceeded in the manner described. The total time for the entire operation may range from two minutes to ten minutes, preferably about five minutes, and the size of the three fractional liming tanks may be so adjusted that their combined capacity is equivalent to the quantity of juice produced by the factory during the period required for fractional liming.

Continuing with the description of the process, the fractionally limed juice passes in a continuous flow from tank 3 into tank 4 and simultaneously liming reagent is added in sufficient amount to completely saturate the juice or as is usually the case, to exceed the saturation point. The total lime addition, including that added to the fractional liming tanks, will be equivalent to 1.5% CaO on beets. This total amount will vary according to the quality and condition of the beets. It may be as low as 1.2% on beets or as high as 2.5% or more. Enough lime must be used to obtain the desired purification. In any case, the amount of lime required by this process will be less than that required by the continuous carbonation processes now in use.

The tank 4 is of such size as to have a three to five minute retention period. The liming reagent and the juice are thoroughly and rapidly mixed either by the mechanical mixing device 11, or by the admission of gas containing $CO_2$, the gas serving as the mixing agent as well as a chemical reagent whereby the carbonation is commenced. Thus, if desired, carbonation may be commenced in tank 4, but it should not be carried to such a point that the concentration of lime is reduced below the saturation point. The fully limed juice, with or without partial carbonation, passes to tank 5, where it is treated with gas containing $CO_2$ in such amount that the concentration of lime is reduced to 0.11 to 0.15 g. per 100 ml. of juice, thence the juice passes into tank 6 and the gassing is continued until the concentration of lime is reduced to the point where the physical characteristics of the precipitated solids and the purification of the juice reach the best stage for subsequent treatment, this concentration being usually about 0.07 to 0.10 g. CaO per 100 ml. of juice. From this point all of the finished carbonated juice is at once treated in the usual manner for the separation of the suspended solids, either by sedimentation or filtration or a combination of both, and no part of it is returned to the system to be mixed with the incoming raw juice. The size of tanks 4, 5 and 6 may vary somewhat, but tank 5, in which most of the carbonating is done, should have a retention period of from five to ten minutes, preferably the latter. Tank 6 may be the same size or a little smaller.

It should be understood that the foregoing description is given by way of illustration only, and that the invention may be successfully carried out in other ways. For example, the addition of the liming reagent may be completed in tank 3 and the whole process carried out in five tanks. Carbonation may be begun in any one of the fractional liming tanks and carried on throughout the system with beneficial results so long as the fundamental conditions are adhered to, viz., that the optimum alkalinity or pH necessary for the maximum precipitation of the colloids be gradually approached and exceeded during the fractional liming stage and that following this stage the juice be limed substantially to or in excess of the saturation point, and that the carbonation as a whole be carried out in such a manner that the physical characteristics of the suspended solids are such that they may be easily removed and washed free of sugar with a minimum quantity of water. Other variations may be introduced, without departing from the scope of our invention.

The temperature of the carbonated juice will be about 75° C. if the incoming juice is 85° C., and if no further heat is applied. The carbonated juice may or may not be heated before going to the filters. If desired, it is possible to carry out the process by having the juice pass through the three fractional liming tanks at a temperature of 40° C. to 60° C., then heating it to 85° C. before it passes to tank 4. In other words, there are two possible methods of fractional liming, the first being carried out at temperatures ranging from 40° C. to 60° C., and the second at temperatures of 80° C. to 90° C. The second method is preferred, and we have embodied that method in the foregoing description.

The advantages obtained by the use of the above described process are, (1) a reduction in the total quantity of lime required together with an improved purification of the juice, (2) reduced cost of filtration due to a saving in labor and filter cloth, since sedimentation methods may be used for separating the precipitated solids from the juice, (3) reduction in sugar losses and a saving in heat for evaporation, since the solids are easily washed free from sugar with a relatively small quantity of water, (4) shortened detention period for the treatment of the juice, reducing the formation of "lime salts" which interfere with evaporation and crystallization and cause scale deposits on heating surfaces, and (5) rapid passage of juice through the purification system, giving increased capacity at low expenditure of power.

Having thus described the invention, what is claimed as new and desired to be secured by Letters Patent is:

1. A method for continuously and simultaneously defecating and carbonating sugar juice, comprising heating the juice to a temperature of 80° C. to 90° C., passing said juice in a continuous stream through a predetermined path, then simultaneously adding regulated streams of liming reagent and carbon dioxide to the juice stream at spaced points in said path, and in such amounts and in such ratio that the alkalinity at which the maximum coagulation of colloids takes place is reached and then substantially exceeded within a period of five to ten minutes, then introducing additional streams of liming reagent and carbon dioxide into the juice at a further point in said path and in such amounts and such ratio that the saturation point of the juice with respect to the liming reagent is rapidly approached and exceeded, then continuing the carbonation to an alkalinity of 0.07 to 0.10 gram CaO per 100 milliliters of juice, and passing the juice so carbonated onward for further treatment.

2. In a method for defecating beet sugar juice, the steps of heating said juice to a temperature of 80° C. to 90° C., passing said juice in a continuous stream through a predetermined path, introducing at one point in said path a quantity of liming reagent equivalent to 0.1% to 0.15% CaO on beets, introducing at a second point in said path a further quantity of liming reagent equivalent to 0.1% to 0.15% CaO on beets, introducing at a third point in said path a further quantity of liming reagent sufficient to make a total equivalent to 0.4% to 0.6% CaO on beets, and introducing at a fourth point in said path a further quantity of liming agent sufficient to make a total equivalent approximately to 1.5% CaO on beets.

3. In a method for defecating and carbonating beet sugar juice, the steps of heating said juice to a temperature of 80° C. to 90° C., passing said juice in a continuous stream through a predetermined path, introducing at one point in said path a quantity of liming reagent equivalent to 0.1% to 0.15% CaO on beets, introducing at a second point in said path a further quantity of liming reagent equivalent to 0.1% to 0.15% CaO on beets, introducing at a third point in said path a further quantity of liming reagent sufficient to make a total equivalent to 0.4% to 0.6% CaO on beets, introducing at a fourth point in said path a further quantity of liming agent sufficient to make a total equivalent approximately to 1.5% CaO on beets, and carbonating said juice to an alkalinity equivalent to 0.07 to 0.10 gram CaO per 100 milliliters of juice.

4. In a method for defecating beet sugar juice, the steps of heating said juice to a temperature of 80° C. to 90° C., passing said juice in a continuous stream through a predetermined path, introducing at one point in said path a quantity of liming reagent equivalent to 0.1% to 0.15% CaO on beets, introducing at a second point in said path a further quantity of liming reagent equivalent to 0.1% to 0.15% CaO on beets, introducing at a third point in said path a further quantity of liming reagent sufficient to make a total equivalent to 0.4% to 0.6% CaO on beets, and introducing at a fourth point in said path a further quantity of liming agent sufficient to make a total equivalent approximately to 1.5% CaO on beets, said juice being propelled at such a speed as to require between five and ten minutes to pass said first three points.

5. In a method of purifying sugar juice, the steps which comprise passing heated juice in a continuous stream through a predetermined path, introducing a plurality of streams of liming reagent into said juice stream at spaced points in said path to bring the juice gradually and in successive stages of alkalinity to an alkalinity substantially in excess of the optimum alkalinity for the coagulation of colloidal impurities, holding the juice at a substantially constant alkalinity for an appreciable interval after the introduction of each of said streams of liming reagent, thereafter introducing additional liming reagent into the juice in an amount sufficient at least to saturate the juice, and then carbonating the saturated juice to an alkalinity giving an easily filterable precipitate, said juice being heated to a temperature of 80° to 90° C. prior to the saturation thereof with liming reagent.

6. In a method of purifying sugar juice, the steps which comprise heating the juice to a temperature of 80° to 90° C., passing the juice in a continuous stream through a predetermined path, introducing a plurality of streams of liming reagent into said juice stream at spaced points in said path and at rates regulated so as to bring the juice at one of said points substantially to the optimum alkalinity for the coagulation of colloidal impurities, and to an alkalinity substantially exceeding said optimum alkalinity at another of said points, holding the juice at a substantially constant alkalinity for an appreciable interval after the introduction of each of said streams of liming reagent, thereafter introducing additional liming reagent into the juice in an amount sufficient at least to saturate the juice, and carbonating the saturated juice to an alkalinity giving an easily filterable precipitate.

7. In a method of purifying sugar juice, the steps which comprise heating the juice to a temperature of 80° to 90° C., passing the juice in a continuous stream through a predetermined path, introducing a plurality of streams of liming reagent into said juice stream at spaced points in said path and at rates regulated so as to bring the juice at one of said points to an alkalinity of about .05 to 0.6 gram CaO per 100 ml. and at another of said points to an alkalinity of about .10 to .18 gram CaO per 100 ml., holding the juice at each stage of alkalinity for an appreciable interval, thereafter introducing additional liming reagent into the juice in an amount sufficient at least to saturate the juice, and carbonating the saturated juice to an alkalinity giving an easily filterable precipitate.

8. In a method of purifying beet sugar juice, the steps which comprise passing heated juice in a continuous stream through a predetermined path, introducing regulated streams of liming reagent into the juice stream at a plurality of spaced points in said path and thereby bringing the juice gradually through distinct and successively increasing stages of alkalinity and finally to a state of complete saturation with the liming reagent, thereafter introducing a regulated flow of carbon dioxide into the stream of juice at a more advanced stage in said path and thereby carbonating the juice to an alkalinity giving an easily filterable precipitate, and continuously passing the carbonated juice onward for further treatment, said juice being heated to a temperature of 80° to 90° C. prior to the saturation thereof with liming reagent.

9. In a method of purifying beet sugar juice, the steps which comprise passing heated juice in a continuous stream through a predetermined path, introducing regulated streams of liming reagent into the juice at a plurality of spaced points in said path, including a point where the juice is brought substantially to the optimum alkalinity for the coagulation of colloidal impurities, a further point where said alkalinity is substantially exceeded and a still further point where the juice is at least saturated with the liming reagent, thereafter carbonating the limed juice, at a more advanced point in said path, to an alkalinity giving an easily filterable precipitate, and passing the carbonated juice onward for further treatment, said juice being heated to a temperature of 80° to 90° C. prior to the saturation thereof with liming reagent.

10. In a method of purifying beet sugar juice, the steps which comprise heating the juice to a temperature of 80° to 90° C., passing the heated juice in a continuous stream through a predetermined path, introducing regulated streams of liming reagent into the juice stream at a plurality of spaced points in said path and thereby bringing the juice gradually and in successive stages to and substantially beyond the optimum alkalinity for the coagulation of colloidal impurities and then to a state of complete saturation with the liming reagent, thereafter introducing regulated streams of carbon dioxide into the stream of juice at a plurality of more advanced points in said path and thereby carbonating the juice to an alkalinity giving an easily filterable precipitate, and continuously passing the carbonated juice onward for further treatment.

11. In a method of purifying beet sugar juice, the steps which comprise passing heated juice in a continuous stream through a predetermined path, introducing regulated streams of liming reagent into the juice stream at a plurality of spaced points in said path and thereby bringing the juice gradually through distinct and successively increasing stages of alkalinity and finally to a state of complete saturation with the liming reagent, said juice being heated to a temperature of 80° to 90° C. prior to the saturation thereof with liming reagent, introducing a stream of carbon dioxide into the stream of saturated juice at a further point in said path in an amount regulated to reduce the alkalinity to about .11 to .15 gram CaO per 100 ml. of juice, introducing another stream of carbon dioxide into the juice stream at a still further point in said path in an amount regulated to reduce the alkalinity to about .07 to .10 gram CaO per 100 ml. of juice, and continuously passing the juice so carbonated onward for further treatment.

12. In a method of purifying beet sugar juice, the steps which comprise heating the juice to a temperature of 80° to 90° C., passing the heated juice in a continuous stream through a predetermined path, introducing regulated streams of liming reagent into the juice stream at a plurality of spaced points in said path and thereby bringing the juice successively and gradually to and substantially beyond the optimum alkalinity for the coagulation of colloidal impurities and then to a state of complete saturation with the liming reagent, introducing at least one stream of carbon dioxide into the juice stream during the introduction of said streams of liming reagent and in a regulated amount insufficient to prevent complete saturation of the juice with liming reagent, thereafter introducing a regulated flow of carbon dioxide into the stream of saturated juice at a more advanced stage in said path and thereby carbonating the juice to an alkalinity giving an easily filterable precipitate, and continuously passing the carbonated juice on for further treatment.

13. In a method of purifying beet sugar juice, the steps which comprise heating the juice to a temperature of 80° to 90° C., passing the heated juice in a continuous stream through a predetermined path, continuously liming the juice at one point in said path to an alkalinity of about 0.25 to .03 gram CaO per 100 ml., continuously liming the juice at a second point in said path to an alkalinity of about .05 to .06 gram CaO per 100 ml., continuously liming the juire at a third point in said path to an alkalinity of about .10 to .18 gram CaO per 100 ml., continuously liming the juice at a fourth point in said path to an alkalinity of about .25 to .30 gram CaO per 100 ml. simultaneously introducing carbon dioxide into the stream at said fourth point at a rate insufficient to under-saturate the juice, thereafter continuously carbonating the saturated juice at a fifth point in said path to an alkalinity of about .11 to .15 gram CaO per 100 ml., continuously carbonating the juice at a sixth point in said path to an alkalinity of about .07 to .10 gram CaO per 100 ml., and continuously passing the carbonated juice onward for further treatment.

14. In a method of purifying beet sugar juice, the steps which comprise heating the juice to a temperature of 80° to 90° C., passing the heated juice in a continuous stream through a predetermined path, continuously liming the juice at one point in said path to an alkalinity of about .025 to .03 gram CaO per 100 ml., continuously liming the juice at a second point in said path to an alkalinity of about .05 to .06 gram CaO per 100 ml., continuously liming the juice at a third point in said path to an alkalinity of about .10 to .18 gram CaO per ml., traversing the juice through the aforesaid points in said path within a period of 2 to 10 minutes, continuously liming the juice at a fourth point in said path to an alkalinity of about .25 to .30 gram CaO per 100 ml., simultaneously introducing carbon dioxide into the stream at said fourth point at a rate insufficient to under-saturate the juice, holding the juice at saturation for a period of 3 to 5 minutes, thereafter continuously carbonating the juice at a fifth point in said path to an alkalinity of about .11 to .15 gram CaO per 100 ml., continuously carbonating the juice at a sixth point in said path to an alkalinity of about .07 to .10 gram CaO per 100 ml., and continuously passing the carbonated juice onward for further treatment.

ROBERT J. BROWN.
ALPHEUS R. NEES.
CLAUDE T. CARNEY.

CERTIFICATE OF CORRECTION.

Patent No. 2,164,186.                                    June 27, 1939.

ROBERT J. BROWN, ET AL.

It is hereby certified that error appears in the printed specification of the above numbered patent requiring correction as follows: Page 1, second column, line 49, strike out the words and syllable "as phosphates, oxalates and sulfates, form defin-" page 2, first column, line 54, for "0.02%" read 0.2%; page 5, first column, line 70, claim 7, for "0.6" read .06; and second column, line 26, claim 9, after "juice" insert the word stream; page 6, first column, line 34, claim 13, for "0.25" read .025; line 37, same claim, for "juire" read juice; and that the said Letters Patent should be read with this correction therein that the same may conform to the record of the case in the Patent Office.

Signed and sealed this 24th day of October, A. D. 1939.

(Seal)                                           Henry Van Arsdale,
                                            Acting Commissioner of Patents.